Dec. 22, 1959  P. SHAVEN  2,918,147
INTERNALLY EXPANDING BAND BRAKE
Filed May 5, 1958  3 Sheets-Sheet 1

INVENTOR.
Peter Shaven,
BY Max R. Kraus
Attorney.

Dec. 22, 1959    P. SHAVEN    2,918,147
INTERNALLY EXPANDING BAND BRAKE
Filed May 5, 1958    3 Sheets-Sheet 2
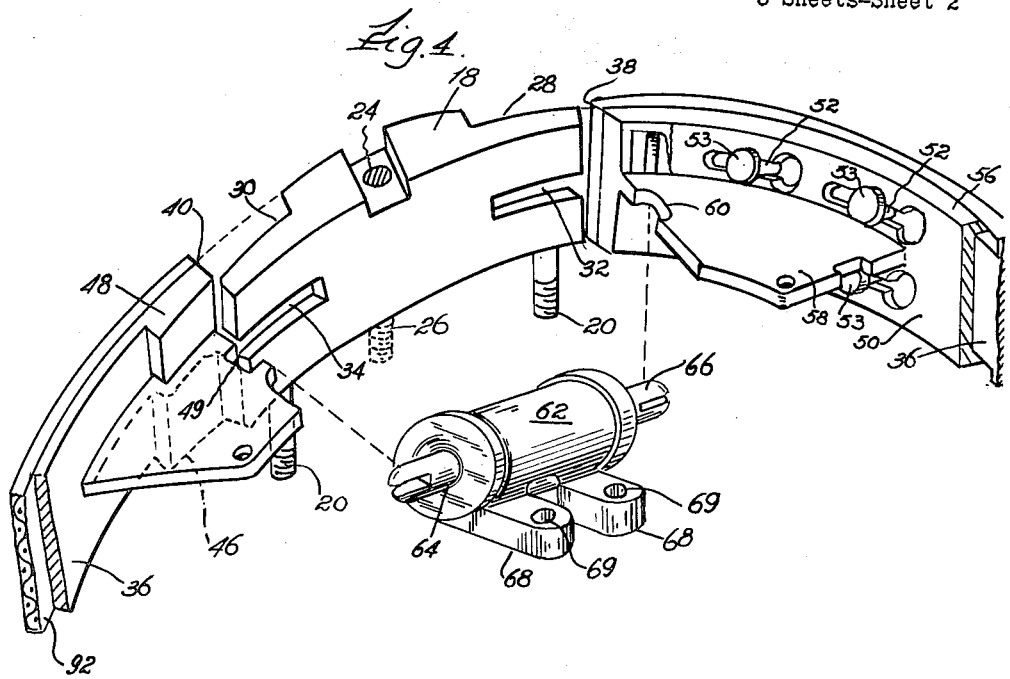
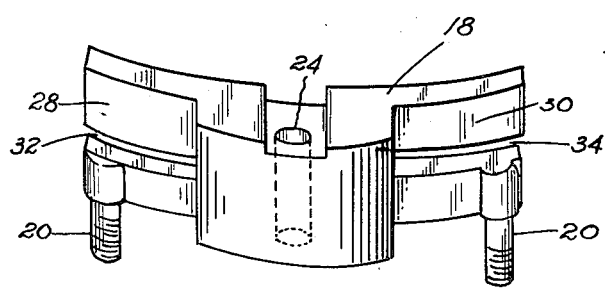
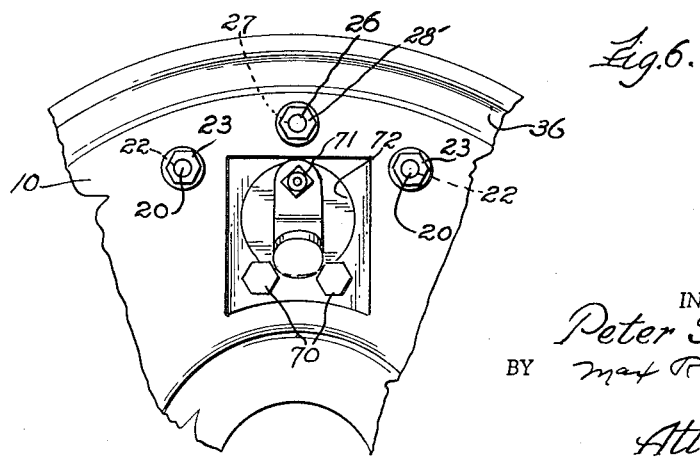
INVENTOR.
Peter Shaven
BY Max P. Kraus
Attorney.

Dec. 22, 1959  P. SHAVEN  2,918,147
INTERNALLY EXPANDING BAND BRAKE
Filed May 5, 1958  3 Sheets-Sheet 3

INVENTOR.
Peter Shaven
BY Max R. Fraco
Attorney.

United States Patent Office 2,918,147
Patented Dec. 22, 1959

2,918,147

INTERNALLY EXPANDING BAND BRAKE

Peter Shaven, Oak Lawn, Ill.

Application May 5, 1958, Serial No. 733,087

4 Claims. (Cl. 188—78)

This invention relates to brakes and more particularly to internal expanding brakes.

One of the objects of this invention is to provide a friction member designed to provide a uniform braking surface throughout its circumference.

Another object of this invention is to provide a friction member including a band divided at one point transversely of its circumference to provide the same with spaced ends, and means for supporting said spaced ends and an adjuster adjacent one of said spaced ends adapted to be adjusted to compensate for any wear on the friction member.

Another object of this invention is to provide a braking unit which is simple in construction, inexpensive to manufacture, highly efficient in operation and which is easy to adjust.

Other objects will become apparent as this description progresses.

In the drawings:

Fig. 4 is an exploded perspective view of a portion of the brake.

Fig. 5 is a perspective view of the block member.

Fig. 6 is an elevational view of a portion of the brake unit looking at same from the side opposite that of Fig. 1.

Figure 1:
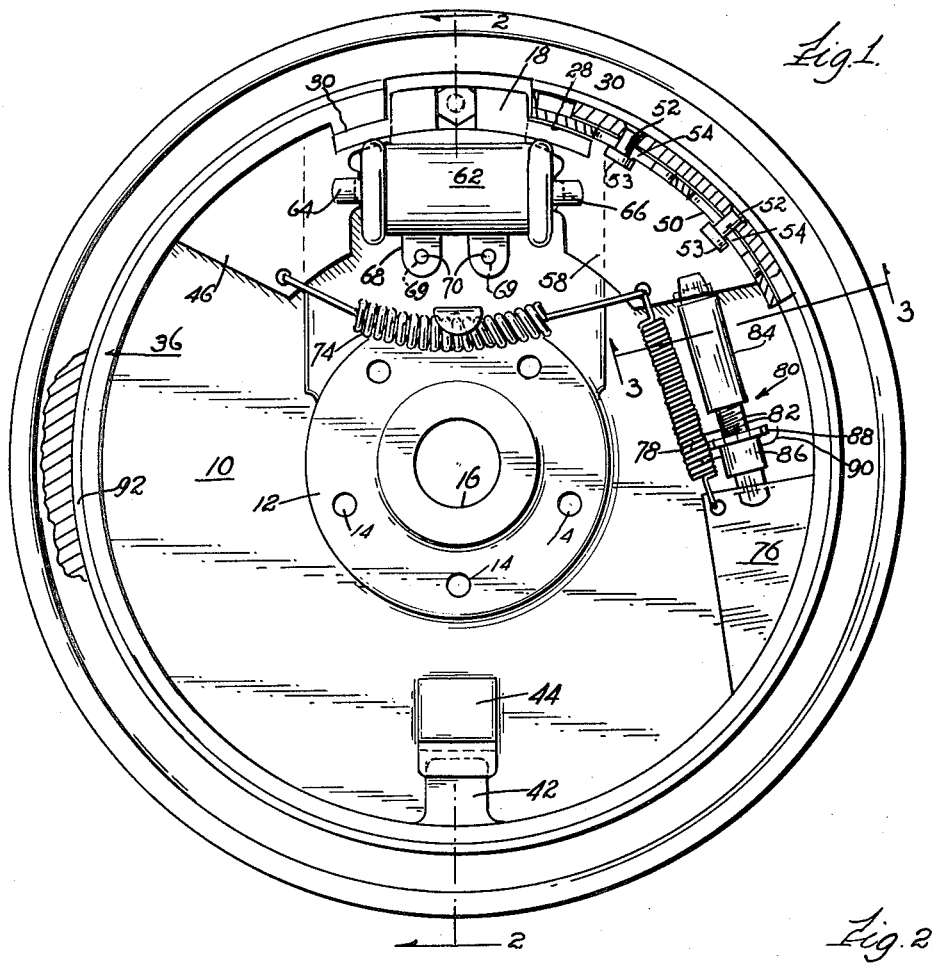
Fig. 1 is a side elevational view of the brake forming this invention, looking at same from the inside.

The stationary annular back plate or mounting plate 10 is provided with an offset portion 12 and the mounting plate 10 is fixed to the axle housing (not shown) of the motor vehicle in the usual manner as by bolts through the several openings 14 adjacent the axle opening 16 of the mounting plate.

An arcuate shaped block member generally indicated at 18 is attached to the mounting plate 10. The block member 18, best shown in Figs. 4 and 5 is provided with a pair of outwardly facing threaded studs 20 which pass through suitably spaced openings 22 in the mounting plate 10. Threaded nuts 23 are secured to said studs and secure said block to said mounting plate in a fixed immovable position. The block 18 is also provided with a central transverse bore 24 through which is secured a threaded bolt 26 which passes through an opening 27 in the mounting plate 10. A threaded nut 28' is secured to said bolt to additionally anchor the block to the plate 10. The opposite upper ends of the block member 18 are reduced to provide recessed end portions 28 and 30. The opposite end portions 28 and 30 of the block each have a longitudinal slot 32 and 34 respectively.

Figure 2:
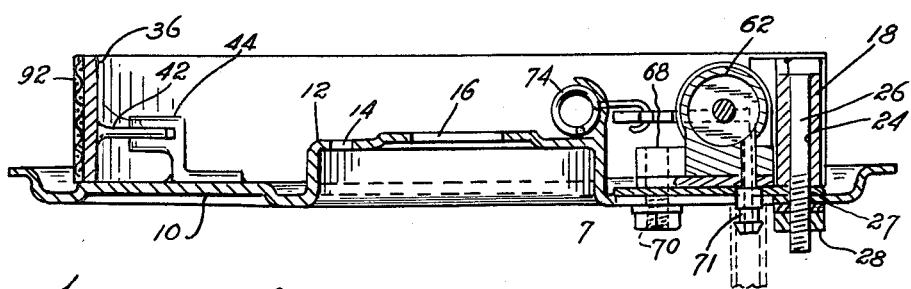
Fig. 2 is a cross sectional view taken on lines 2—2 of Fig. 1.
Figure 3:
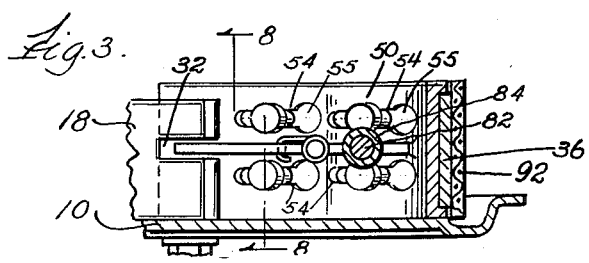
Fig. 3 is a cross sectional view taken on lines 3—3 of Fig. 1.
Figure 7:
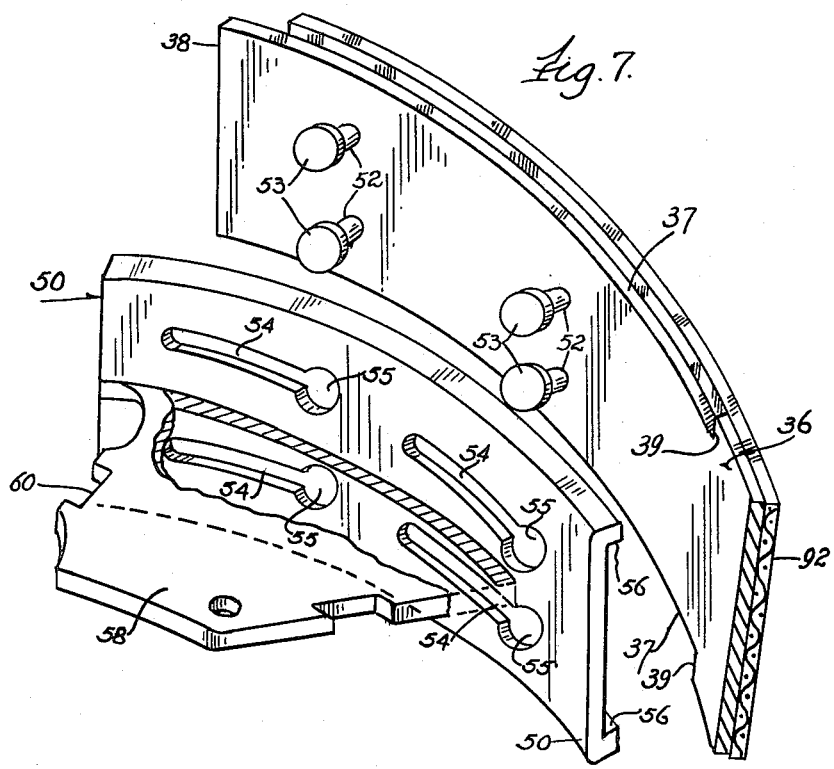
Fig. 7 is an exploded perspective view of a certain portion of the band and the adjuster member.
Figure 8:
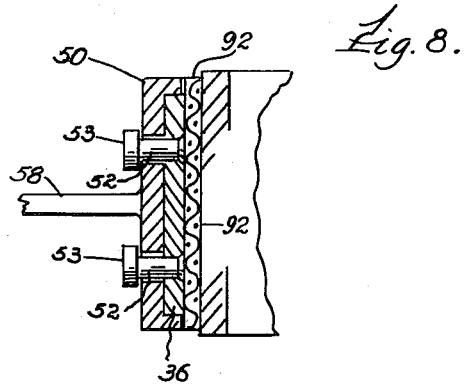
Fig. 8 is a cross sectional view taken on lines 8—8 of Fig. 3.

The brake shoe includes a steel band or annulus generally indicated at 36 divided at one point transversely of its circumference to provide the same with spaced ends 38 and 40. The band 36 is supported on said mounting plate 10, as best shown in Figs. 1 and 2. Extending radially inward from the lower end of the band is a lug 42 which is received in a bracket 44 secured to the mounting plate 10. The band 36 adjacent the divided end 40 is provided with an inward radially extending rib 46 which is secured to the band as to be integral therewith. The front or outer end of said rib 46 is received within the slot 34 of the block member 18 with the end of the band adjacent the divided portion 40 extending over the recessed end 30 of the block 18. Secured to the inner surface of the band 36 is a filler member 48 which fits within the recessed end portion 30 of the block 18. The front end of the rib 46 is also provided with a recessed portion 49 which is engaged and straddled by the plunger or piston stem of the hydraulic member, to be presently described.

An arcuate shaped adjuster generally indicated at 50 is slideably mounted for adjustment on the band 36 adjacent the divided end 38. The band 36 has a plurality of spaced inwardly extending studs 52 each having enlarge heads 53. The adjuster 50 is provided with a plurality of slots 54 each having an entrance opening 55 whereby the adjuster 50 is positioned on the band 36 through the entrance openings 55 and the slots 54 are in engagement with the studs 52. The adjuster 50 is channel shaped in cross section with the opposite flanges 56 thereof embracing the opposite side walls of the band 36 which is reduced in width as indicated at 37 for a portion of its length where the adjuster 50 engages said band and shoulders 39 limit the inward adjustment of adjuster 50. The adjuster 50 is provided with an inward radially extending rib 58 affixed thereto which is generally similar to the rib 46 previously described. The front or outer end of rib 58 extends into the slot 32 of the block 18 and the front of the rib below the portion which extends into the slot is recessed as at 60 for engagement with one of the plungers or piston stems of the hydraulic member.

The hydraulic member generally indicated at 62 is of conventional construction and is disposed horizontally between the ribs 46 and 58 and is fixedly secured to the mounting plate 10. The hydraulic member is provided with oppositely acting plungers or piston stems 64 and 66. The ends of the plungers are bifurcated with the plunger 64 straddling and engaging the rib 46 and the opposite plunger 66 straddling and engaging the rib 58 on the adjuster 50.

The hydraulic cylinder 62 has a support 68 provided with openings 69 whereby it is secured by suitable bolts 70 to the mounting plate 10. The side of the hydraulic cylinder 50 adjacent to and facing the mounting plate 10 (Fig. 6) has an entrance nipple 71 for passage of the operating liquid into and out of the cylinder and the nipple is connected by conventional means to the brake device through an opening 72 in the mounting plate 10. A coil spring 74 is anchored at its opposite ends to the two ribs 46 and 58.

The band 36 is also provided with another inward radially extending rib 76 affixed thereto and a coil spring 78 is anchored at its opposite ends to rib 58 of the movable adjuster 50 and to rib 76. The movable adjuster 50 is controlled by an adjustment screw device generally indicated at 80 which comprises a threaded member 82 having one end received in an internally threaded sleeve 84 with the opposite end of the sleeve 84 in engagement with the inwardly radially extending rib 58 on the movable adjuster 50. The opposite end of the threaded member 82 is received in an internally threaded sleeve 86 which is secured to the rib 76 on the band 36. A peripherally toothed member 88 is mounted on the threaded member 82 for rotating same and member 88 is accessible for adjustment from the outside through an opening 90 in the mounting plate 10. The internally threaded sleeves 84 and 86 are reversely threaded as is the opposite ends of the threaded member 82, as is well understood. A lining material 92 is suitably secured to the band 36 and extends around the entire band surface and provides a peripherally outer braking face.

The operation will be understood from the foregoing but briefly described is as follows. When the brake pedal is applied, the hydraulic cylinder 62 will be actuated to cause both plungers 64 and 66 thereof to move outwardly simultaneously. The plungers 64 and 66 act against the ribs 46 and 58 to expand the band 36 and apply a braking action to the rotating wheel. The ribs 46 and 58 will move within the confines of their respective slots 34 and 32 in the block 18. Since the adjuster member 50 when in adjusted position is immovable with respect to the band 36, any thrust against the rib 58 of the adjuster 50 by means of the plunger 66 will cause a radial expansion of the band 36. Likewise, the plunger 64 will act similarly against the rib 46 to cause a radial expansion of the band. Upon release of the braking pedal the spring 74 will move the plungers 64 and 66 of the hydraulic cylinder 62 inwardly to cause a radial contraction of the band 36. To effect adjustment of the adjusting member 50 to compensate for wear of the brake lining the adjusting screw 80 is rotated, which will slide the adjusting member 50 relative to the band 36.

It will be understood that various changes and modifications may be made from the foregoing without departing from the spirit and scope of the appended claims.

I claim:

1. A brake comprising a supporting plate, a band supported on said plate, said band being divided at one point transversely of its circumference to provide the band with spaced ends, a member secured to said plate and positioned between said spaced ends, said member having reduced opposite ends and a slot at each of said ends, an inwardly extending rib secured to said band adjacent one of said spaced ends, an arcuate shaped section adjustably secured to the band adjacent the opposite spaced end of the band, said arcuate shaped section having an inwardly extending rib, each of said ribs extending into the slot of said member adjacent the respective rib, and means engaging said ribs for expanding said band.

2. A brake comprising a supporting plate, a band supported on said plate, said band being divided at one point transversely of its circumference to provide the band with spaced ends, a member secured to said plate and positioned between said spaced ends, said member having reduced opposite ends and a slot at each of said ends, an inwardly extending rib secured to said band adjacent one of said spaced ends, an arcuate shaped section adjustably secured to the band adjacent the opposite spaced end of the band, said arcuate shaped section having an inwardly extending rib, each of said ribs extending into the slot of said member adjacent the respective rib, said band having studs in cooperating engagement with slots in said arcuate shaped section, and hydraulic operated means secured to said supporting plate and engaging said ribs for expanding said band.

3. A brake comprising a supporting plate, a band supported on said plate, said band being divided to provide the band with spaced ends, a member secured to said plate between the spaced ends of said band, said member having its opposite ends reduced to accommodate the ends of the band so that the spaced ends of the band extend over the opposite reduced ends of said member, said member having a longitudinal slot at each of its ends extending into the reduced ends, a rib secured to each of the opposite ends of the band, each of said ribs extending into the slot in said member adjacent the respective rib, and means engaging said ribs for expanding said band.

4. A brake comprising a supporting plate, a band supported on said plate, said band being divided to provide the band with spaced ends, a block member secured to said plate between the spaced ends of said band, said block member having its opposite ends reduced to define a recess at each end between said block member and the band to accommodate the spaced ends of the band so that the spaced ends of the band are confined within said recesses, said block member having a longitudinal slot at each of its ends extending into the reduced ends, a rib secured to each of the opposite ends of the band, each of said ribs extending into the slot in said block member adjacent the respective rib, and means engaging said ribs for expanding said band.

References Cited in the file of this patent

UNITED STATES PATENTS

| | | |
|---|---|---|
| 1,536,640 | Vanderbeek | May 5, 1925 |
| 1,806,296 | Kohr | May 19, 1931 |
| 1,911,452 | La Brie | May 30, 1933 |
| 2,055,330 | Bold | Sept. 22, 1936 |
| 2,215,747 | White et al. | Sept. 24, 1940 |